UNITED STATES PATENT OFFICE.

FREDERICK SALATHÉ, OF JERSEY CITY, NEW JERSEY, ASSIGNOR, BY MESNE ASSIGNMENTS, TO THE LITHO-CARBON COMPANY, OF NEW YORK, N. Y.

PAINT, VARNISH, JAPAN, &c.

SPECIFICATION forming part of Letters Patent No. 452,761, dated May 19, 1891.

Application filed November 12, 1890. Serial No. 371,122. (No specimens.)

*To all whom it may concern:*

Be it known that I, FREDERICK SALATHÉ, a citizen of the United States, residing at Jersey City, in the county of Hudson, in the State of New Jersey, have invented new and useful Improvements in Paints, Varnishes, Japans, &c., of which the following is a specification.

The basis and essentially novel ingredient of the paint as well as the varnish or japan hereinafter described is a new hydrocarbon product, the properties and characteristics of which will be presently set forth.

I shall describe first the manner of making the paint and then the manner in which the varnish or japan may be produced. The paint is composed of a suitable solvent and a pigment or pigments, in conjunction with a peculiar and hitherto unknown hydrocarbon product of which I am the inventor, which hydrocarbon product, as well as the process by which it is obtained, is fully set forth and claimed by me in my application for Letters Patent filed March 6, 1891, bearing Serial No. 383,942, on which Letters Patent issue of even date herewith, and to which reference is hereby made for more complete information. It is sufficient here to say that the said hydrocarbon product is a resinoid hydrocarbon of the $C_{10}H_{16}$ series, which has substantially the following analysis: carbon, 88.23; hydrogen, 11.59; oxygen, .06; sulphur, trace, the same being a solid material with a specific gravity of from 1.000 to 1.028, tough and of a glossy jet-black color, flexible, and somewhat plastic at ordinary temperatures, soluble in naphtha, benzole, chloroform, bisulphide of carbon, partially in ether, completely in turpentine, rosin-oils, &c., capable of withstanding a temperature of 600° Fahrenheit and resisting alkalies and acids, excepting concentrated nitric and concentrated sulphuric acids. It is obtained from a natural substance, which, so far as I am at present informed, is found in the State of Texas only, but which, possibly, may exist in other localities, the treatment which I employ for obtaining this product consisting, essentially, in first separating the crude natural substance from the sand or shell-rock, in which it is found in nature, by means of a solvent, then separating or driving off the solvent from the crude material thus obtained, and finally injecting steam or hot air into the said crude material in order to drive off the sulphur and volatile-oil constituents which are combined therewith, as well as to supply the said material with the oxygen which is lacking in the natural substance, all as more fully set forth in my aforesaid application, Serial No. 383,942.

In the preparation of my improved paint I bring my hydrocarbon product to molten condition by the application of heat, and in this condition mix it with the solvent, the temperature bearing due relation to the volatilizing-point of the solvent used, so that it shall not be sufficient to unduly volatilize and waste the solvent during the operation of manufacturing the paint. When spirits of turpentine is used as the solvent, I prefer to heat it separately to near its boiling-point, and then to mix it with the hydrocarbon product at a substantially corresponding temperature. In this way I secure a perfectly homogeneous solution.

Any other suitable method of incorporating the two together may of course be employed.

The proportion of solvent to the hydrocarbon product varies of course with the desired consistency of the paint. In general the hydrocarbon product may be from one-fourth to equal volume as compared with the solvent. The solvent or liquid thus obtained has of course the black color derived from the hydrocarbon product; but this color, by suitable pigments, can be controlled and varied, but not to a substantially white tint. Light grays, greens, reds, blue, &c., may, however, be obtained by the use of suitable pigments. The pigments of whatever color or character desired are added to the substance and thoroughly incorporated therewith by grinding in the well-known manner of grinding paints or by any other appropriate means. The pigments may be white lead, zinc, white or oxide of zinc, ground asbestus, talc, infusorial earth, oxide of iron, vermilion, chrome-green, ultramarine, or mixtures or combinations of these, or any other suitable pigments may be employed to produce the desired shade or color by modifying the original black of the solution. The quantity of pigment for any given quantity or weight of paint varies of course according to the taste or shades desired. From two to twelve pounds of pigment (more or less) to the gallon of solution of the hydrocarbon product may be advantageously employed, according to circumstances. Boiled linseed-oil may be added when desired; but this, while permissible, is not necessary. A like remark applies to drying agents, such as borate of manganese, red lead, &c., which may be added in small quantities, if desired.

The new and improved paint comprised in my said invention is strongly adhesive to wood and metal, has a high brilliancy of surface, closely resembling enamel, has great spreading properties, which facilitate its distribution upon the surface to be painted and enable a moderate quantity to cover a large surface. It resists dilute acids and alkalies and the effects of noxious and corrosive gases, and is capable, without blistering and without losing its sufficiently flexible character, of resisting a temperature exceeding 400° Fahrenheit. It is thus especially adapted for hardening exposed surfaces, such as those of buildings, railroad-cars, iron-work, ships' bottoms, &c., for coating the outer surface of the insulating material of electric wires, and generally whenever a strong and durable protective or insulating coating is desired.

In the preparation of my improved varnish or japan I prefer to proceed as follows: I bring my hydrocarbon product to a semi-fluid or viscous condition by subjecting it to proper heat, and I then incorporate therewith a suitable solvent—e. g., spirits of turpentine, benzole, toluole, xylole, bisulphide of carbon, chloroform, petro-benzine, refined petroleum, &c., or a mixture of them when desired. In the preliminary melting or partial melting of the hydrocarbon product care should be taken that its temperature does not reach the boiling-point of the subsequently-added solvent, for this would result in waste of the solvent. The solution should be rendered homogeneous by careful and continued stirring or otherwise. The proportion of solvent to any given quantity of the hydrocarbon product is dependent upon the extent desired in flowing or covering quality of the varnish or japan, the greater the proportion of solvent the greater the surface over which the varnish or japan may be spread. Thus the solvent by measure may be but one-fourth the quantity of the hydrocarbon product when a thick and japan-like varnish is desired. On the other hand a thin and easily flowing varnish may be made with twelve volumes of solvent to one of the hydrocarbon product, and varnishes and japans of various consistencies may be made by varying the proportion of solvent between these two extremes or even above and below the same. The solution in and incorporation with the solvent of the hydrocarbon product may preferably be carried on with a closed vessel or receptacle to prevent evaporation of the solution.

An additional hardness and glass-like finish when applied to use may be given to the varnish or japan made as hereinbefore described by incorporating therewith a gum-resin—such, for example, as melted copal capable of solution in the same or similar solvent as that used with hydrocarbon product during the process of making the varnish or japan.

Varnishes or japans made according to my invention have a deep-black color, an extremely smooth and glassy surface when applied to use, and are capable of production at an extremely moderate cost. They may be advantageously applied to any metal or other surface or surfaces upon which a protective coating capable of resisting corrosion from any cause is desired, or for any other purposes for which a varnish may be required, and inasmuch as the varnish or japan made according to my invention is capable of resisting a temperature of 400° Fahrenheit or even more, it may be employed in many cases for many purposes for which ordinary varnishes are entirely inadmissible, and, further, as it resists the action of ammonia, possesses a firm, hard, and glassy finish when applied to use, it has special value as a varnish for coaches, carriages, and other vehicles which are frequently stored or kept in close proximity to stables from which ammonia fumes are evolved in large quantities.

What I claim as my invention is—

1. A paint composed of the herein-described hydrocarbon product in conjunction with a suitable solvent and a pigment or pigments, substantially as herein set forth.

2. A varnish consisting, essentially, of the herein-described hydrocarbon product dissolved in a suitable solvent.

FREDERICK SALATHÉ.

Witnesses:
CHARLES TAYLOR,
JOHN C. DICKINSON.

It is hereby certified that the assignee, "The Litho-Carbon Company," in Letters Patent No. 452,761, granted May 19, 1891, upon the application of Frederick Salathé, of Jersey City, New Jersey, for an improvement in "Paints, Varnishes, Japans, etc.," should have been described and specified as *The Litho-Carbon Company, a corporation of the State of New Jersey*, instead of "The Litho-Carbon Company, of New York, N. Y.;" and that the said Letters Patent should be read with this correction therein that the same may conform to the record of the case in the Patent Office.

Signed, countersigned, and sealed this 16th day of June, A. D. 1891.

[SEAL.]

CYRUS BUSSEY,
*Assistant Secretary of the Interior.*

Countersigned:
 C. E. MITCHELL,
  *Commissioner of Patents.*